Nov. 19, 1940.                S. FEINGOLD                2,221,867
APPARATUS FOR INTERMITTENTLY OPERATING ELECTRICAL LOAD DEVICES
                  Filed March 24, 1938        2 Sheets-Sheet 1
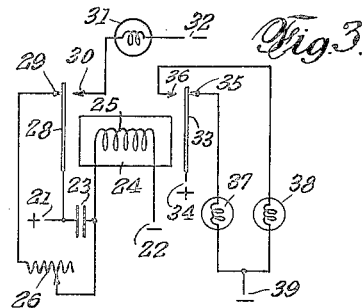
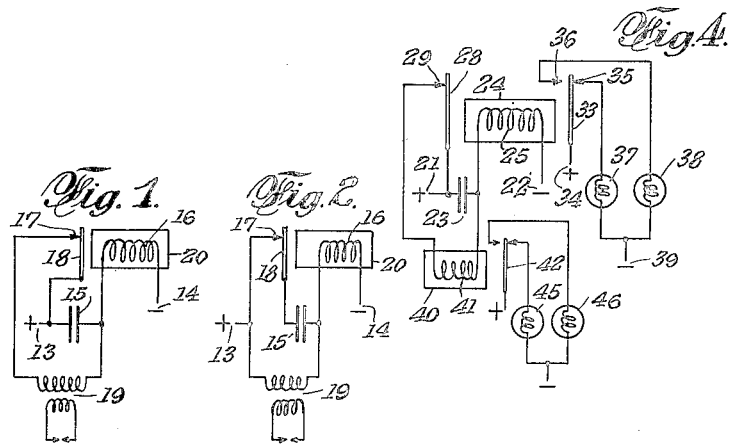
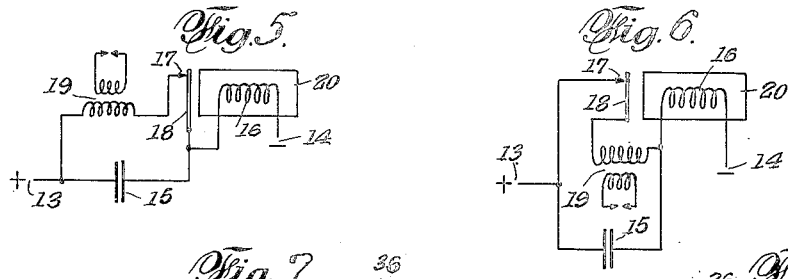
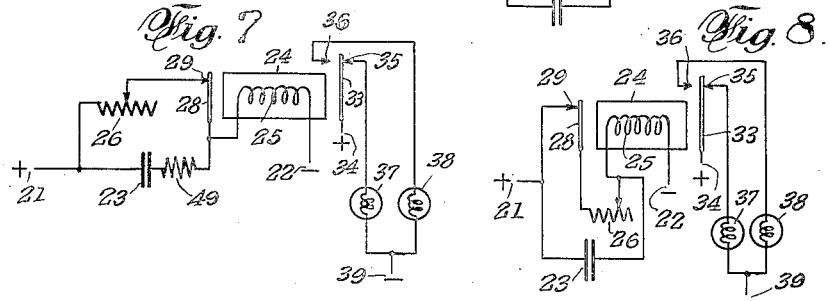
INVENTOR
SAMUEL FEINGOLD
BY
Hyman Jackman
ATTORNEY Nov. 19, 1940.     S. FEINGOLD     2,221,867
APPARATUS FOR INTERMITTENTLY OPERATING ELECTRICAL LOAD DEVICES
Filed March 24, 1938     2 Sheets-Sheet 2
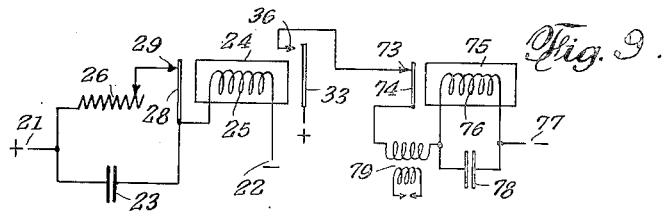
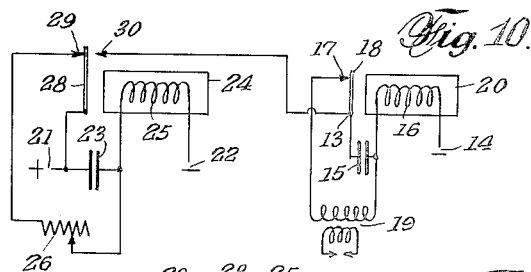
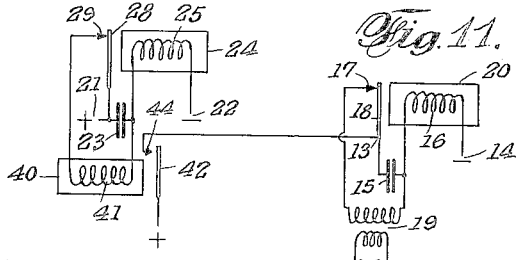
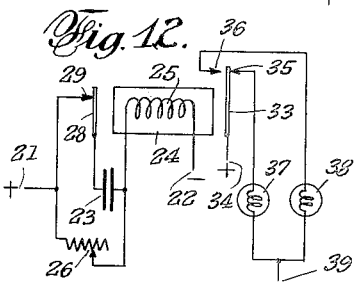
INVENTOR
SAMUEL FEINGOLD
BY
Hyman Jackman
ATTORNEY Patented Nov. 19, 1940

2,221,867

UNITED STATES PATENT OFFICE 2,221,867

APPARATUS FOR INTERMITTENTLY OPERATING ELECTRICAL LOAD DEVICES

Samuel Feingold, Brooklyn, N. Y.

Application March 24, 1938, Serial No. 197,334

6 Claims. (Cl. 175—373)

This invention relates to improvements in direct current intermittently operated electrical devices, and broadly deals with devices of the character contemplated wherein electrical means are provided for intermittently operating desired electrical load devices.

The present invention deals with intermittently operating electrical devices employing direct current wherein a condenser is charged through a load and discharged either through said load or through another load. The charging process may serve to operate electrical load devices such as resistors, relays, coils, gaseous tubes, incandescent lamps, circuit breakers, etc. The discharge voltage of the condenser also may be employed for charging devices for safeguarding property as for instance strong boxes, safes, fences, homes, etc. For certain of the above, said discharge voltage may be stepped up through inductive impedance to provide the desired operative results.

The accompanying drawings illustrate various electric and electro-mechanical apparatus for carrying out the purposes of the invention. The circuits shown by no means exhaust the uses or applications of the invention and are intended as exemplary only of the universal application of the principles of the invention. As the following specification, which is based on these drawings, progresses, the features, purposes, and advantages of the invention will become more clearly apparent.

In the drawings:

Figs. 1, 2, 5 and 6 are wiring diagrams of apparatus for producing the intermittent operations of a load device.

Figs. 3, 4, 7, 8 and 12 are wiring diagrams of apparatus for variably controlling the time of operation of load devices.

Figs. 9, 10, and 11 are wiring diagrams of apparatus acting as controller and load devices.

If a condenser is shunted by a resistance, and to the combination, a potential or voltage is applied, the condenser will charge up to the voltage of the applied source of current. If now this current source is removed, the condenser will discharge through the resistance, the rate of discharge depending upon the values of the capacity and resistance of the circuit. If the resistance is replaced by an inductance such as a transformer or a combination of resistance and inductance such as a relay or the like, the condenser in discharging can be made to do useful work. In the case of the transformer, the discharging current will be varying and oscillatory and will produce a varying or alternating current in the secondary, the value of said current depending upon the capacity of the condenser, the resistance, and inductance of the transformer, and upon the ratio of the primary to secondary turns. When a relay or the like is substituted for the resistance, the current discharging through it can produce mechanical action. One or more coils of a multi-coil device can be connected across the condenser, and the discharging current can aid one coil to assist or counteract the flux produced in any of the other coils. If the coil is in series with the parallel combination of condenser and resistance or condenser and inductance, and a resistance or resistance-inductance combination such as a relay were added and a voltage applied across the end terminals, the current would be at a maximum in the relay at the instant of voltage application, would diminish in value as the condenser charges up, and finally reach a steady value, depending on the voltage and the resistance values of the series and shunt inductances. The condenser would then charge to the value of the voltage across the shunt inductance. When the voltage is removed, the condenser will discharge through the shunt inductance, or whatever load is placed across it and produce electrical or mechanical effects characteristic of the load. If the series inductance is a relay, the contact springs can be wired to automatically remove the voltage, allowing the condenser to discharge through the load. In this case the device would be a self-interrupted pulser.

If a condenser is placed in series with a resistance and current applied, the condenser will charge up through the resistance to the value of the applied voltage at which time the current will stop flowing due to the counter E. M. F. of the condenser. If the voltage is now removed, the condenser will remain in a charged state since the charge cannot leak off anywhere. If a load were now placed across the condenser, the load would be acted upon by the discharging current. If the resistance were replaced by a relay, the contact springs thereof can be so arranged and wired that a condenser will charge up through the relay coil and discharge through a load device when the relay current stops flowing. The device thus can be made self-actuating.

The foregoing principles have been described in my previous applications, Serial Nos. 81,831 and 145,286.

Referring now to the drawings, the polarity markings simply indicate connection to a source of current and need not be of the sign shown.

In Fig. 1 is shown an apparatus for intermittently operating a load employing an electro-mechanical or electromagnetic device of the switch type. This device shown at 20 as solenoid operated may be also magnetic operated or of the pendulum or rocker arm type fitted with contacts. It may or may not be self-starting although shown here of the self-starting type. One end of this device is connected to a source of current at 14 and in series therewith is placed a condenser 15 which is connected at 13 to said current source. The last-mentioned current source connection is connected with the armature 18 of said device 20 and a load 19 is shunted across the condenser and said armature. In this device current will flow from the terminal 13 through the condenser 15 and through the coil 16 of the electromagnetic device 20 to the other terminal 14. The coil 16 will become energized to attract the armature 18 and removing said armature from engagement with the contact 17 current will continue to flow until the condenser 15 has been fully charged. At this time the current flow will stop and the coil 16 will be de-energized allowing the armature 18 to reengage the contact 17. This short-circuits the condenser through the load 19 which in the present instance is the primary winding of a transformer, and the condenser will discharge through said load. After discharge, the cycle is again repeated.

The apparatus shown in Fig. 2 is substantially similar to that described for Fig. 1 with the exception that the current source terminal 13 is connected to both the load 19 and the contact 17 instead of to the armature 18 and the condenser 15. The operating effect here is the same since the condenser 15 discharges through the load 19 upon engagement of the contact 17 with the armature 18.

Somewhat similarly to the two devices above described the apparatus shown in Fig. 5 has its terminal 13 connected to the condenser 15 and to the load 19; and in Fig. 6 said terminals connected to the contact 17 and to the condenser 15. The operating effects of these two devices are similar to those above described.

In Fig. 7 there is illustrated a system for timing the operation of a load or series of loads in a definite time cycle. Here the principle that a charged condenser in series with an electrical device will prevent the passage of current through that device unless some or all of the charge is removed, is employed. In this device the terminals of the exciting current source, designated 21 and 22 are connected in series with the coil 25 of an electro-magnetic switch 24, with the armature 28 of said switch, a contact 29 and a variable resistance 26. Shunted across said armature, contact and resistance there is connected a condenser 23. The electro-magnetic switch is provided with a second armature 33 having association with contacts 35 and 36 and loads 37 and 38 are respectively connected with said contacts and connected with a common terminal of a current supply 39, the armature 33 being also connected to said current supply. In operation current will flow through the coil 25 charging the condenser 23 and the armatures 28 and 33 will be attracted until the condenser 23 is fully charged. The armature 28 will thus be out of contact with the contact 29 and the armature 33 will be in contact with the contact 36. This latter condition will cause operation of the load device 38 by reason of the source of power at the terminals 34 and 39 which incidently may be connected to the same source of power as the terminals 21 and 22. When the condenser 23 has been charged up, the current flow in 25 will cease and the armatures 28 and 33 will resume the position shown in the drawings. The armature 33 will now be in contact with the contact 35 to place the load 37 in operative circuit, and the armature 28 will now be in contact with the contact 29 to enable the condenser 23 to discharge through the resistance 26. Since the rate of charge and discharge of the condenser depends upon the value of the resistance for a constant capacity, increasing the resistance 26 has the effect of slowing down the discharge and decreasing said resistance has the opposite effect of speeding up the discharge. The condenser will discharge to the value of the voltage drop across the resistance. When that voltage is reached current will flow through the parallel arrangement of the resistance 26 and the condenser 23 and also through the coil 25. This coil will then again attract the armatures 28 and 33 and the cycle of operation will repeat. A limiting resistance 49 which may be variable if desired may be placed in series with the condenser 23 to further control the rate of charge and discharge of said condenser. When such a resistance is absent the rate of charge is dependent wholly upon the resistance of the electro-magnetic switch and the capacity thereon.

The apparatus shown in Fig. 8 differs from the device of Fig. 7 in the different point of application of one of the power source terminals. In this instance said terminal is connected to the contact 29 and the condenser 23, the resistance 26 being connected between the armature 28 and the coil 25. This device will operate substantially similarly to the device shown in Fig. 7.

The apparatus shown in Fig. 12 has one terminal of the power source connected to the contact 29 and the resistance 26 and the condenser 23 is connected to the armature 28 and the coil 25 as well as to the variable resistance 26. The operation of this device is also similar to those above described.

The devices shown in Figs. 3 and 4 are timing devices of the general types shown in Figs. 7, 8, and 12. In Fig. 3 the armature 28 is provided with an additional contact 30 connected in series with a load device 31. The charging of the condenser 23 through the coil 25 is the same as before described for Fig. 7. When the armature 28 engages the contact 30 the load 31 is operated, said load getting its opposite potential at 32. Simultaneously, the armature 33 engages the contact 36 operating a load device 38. When the two armatures return to the position shown the condenser discharges and the load 37 is operated.

In Fig. 4 the condenser 23 instead of discharging through the resistance is arranged to discharge through the coil 41 of an electro-magnetic switch device 40. The switch 42 of said device is arranged to operate alternately the loads 45 and 46.

Timing circuits above described may be employed to control other pulsating circuits, these latter circuits then being in the nature of loads. Three representative circuits of this nature have been shown in Figs. 9, 10, and 11.

The timing circuit shown in Fig. 9 is essentially similar to that shown in Fig. 7 and its operation will be clear from the foregoing description. The pulsating circuit comprises an electro-magnet device 75 having its coil 76 in parallel with a condenser 78 and provided with an armature 74 having a contact 73 connected with the contact 36 associated with the armature 33 of the timing unit. A load 79 is connected in series with the parallel arrangement of the coil 76 and condenser 78, and the armature 74. In operation, when the armature 33 is attracted to the contact 36, current flows through contact 73, armature 74, load 79, and condenser 78, to terminal 77. The load 79 is thus energized and the condenser 78 charged. The device 75 being highly sensitive and quick acting, will operate when the condenser has received only a small charge and the voltage drop thereacross will be sufficiently high to operate said device. The armature 74 will be attracted to break the circuit, and the condenser 78 will discharge through the coil 76 to cause attraction of the armature 74 for the period of discharge. Breaking the circuit also causes deenergization of the load 79 and the pulsing circuit can be thus made to operate several times for each cycle of operation of the timing circuit.

Fig. 10 illustrates a combination of the apparatus shown in Figs. 3 and 1 wherein the former is used as a timer and the latter as a pulser. Here again the pulser may operate several times for each cycle of operation of the timer.

In Fig. 11 is shown a combination of a timer such as shown in Fig. 4 and a pulser such as shown in Fig. 1 giving a similar type of operation.

I claim:

1. Intermittently operating electrical apparatus comprising a condenser and an electro-magnetic device including a switch, said condenser and electro magnetic device being connected in series with a source of direct current, and an electric load device connected in series with said condenser and said switch for receiving and discharge of said condenser when the current flow through said electro-magnetic device is interrupted by the increased counter E. M. F. of the condenser when charged.

2. In apparatus of the character described, a condenser, a load device, and a switch connected to form a circuit for discharging said condenser into said load, an electro-magnetic device for controlling said switch connected in series with said discharge circuit, and a source of direct current having one terminal connected to said discharge circuit and the other to said electro-magnetic device, said electro-magnetic device holding said switch open during the charging period of said condenser and releasing said switch to form the mentioned discharging circuit when the current flow through said electro-magnetic device is interrupted by the increased counter E. M. F. of the condenser when charged.

3. In apparatus of the character described, a condenser charging circuit comprising a condenser and an electro-magnetic device in series with a source of direct current, and a discharging circuit for said condenser comprising said condenser, a load device for receiving the discharge of said condenser and a switch associated with said electro-magnetic device for closing said discharging circuit upon interruption of current flow in said latter device caused by the increased counter E. M. F. of the charged condenser.

4. In apparatus of the character described, a source of direct current, a condenser and an electro-magnetic device in series with said source of direct current, and an electric load device and a switch controlled by said electro-magnetic device in shunt with said condenser, said load device absorbing the discharge of said condenser upon interruption of the current flow through the switch by said electro-magnetic device.

5. Intermittently operating electrical apparatus comprising a condenser and an electro-magnetic device in series with one terminal of a source of direct current, a discharge circuit for the condenser comprising said condenser, a resistance and a switch associated with said electro-magnetic device, said discharge circuit being connected to the other terminal of said source of direct current, said resistance receiving the discharge of said condenser through said switch upon interruption by the increased counter E. M. F. of the charged condenser of the current flow through said electro-magnetic device, a second switch operable by said electro-magnetic device, load devices connected to said second switch, and direct current connections for said load devices and said second switch.

6. Intermittently operating electrical apparatus comprising a condenser and an electro-magnetic device in series with a source of direct current, a discharge circuit for the condenser comprising said condenser, an electric device, and a switch associated with said electro-magnetic device, said electric device receiving the discharge of said condenser through said switch upon interruption by the increased counter E. M. F. of the charged condenser of the current flow through said electro-magnetic device, a second switch operable by said electro-magnetic device, load devices connected to said second switch, direct current connections for said load devices and said second switch, and another load device connected to the first-mentioned switch and operable during the charging period of the condenser.

SAMUEL FEINGOLD.

CERTIFICATE OF CORRECTION.

Patent No. 2,221,867. November 19, 1940.

SAMUEL FEINGOLD.

It is hereby certified that error appears in the printed specification of the above numbered patent requiring correction as follows: Page 3, first column, line 40, claim 1, for the word "and" after "receiving" read --the--; and that the said Letters Patent should be read with this correction therein that the same may conform to the record of the case in the Patent Office.

Signed and sealed this 31st day of December, A. D. 1940.

(Seal)

Henry Van Arsdale,
Acting Commissioner of Patents.